United States Patent
Sekiguchi et al.

(10) Patent No.: US 9,593,213 B2
(45) Date of Patent: Mar. 14, 2017

(54) POLYLACTIC RESIN COMPOSITION AND MOLDING

(71) Applicants: Satoyuki Sekiguchi, Shizuoka (JP); Daisuke Asahina, Shizuoka (JP)

(72) Inventors: Satoyuki Sekiguchi, Shizuoka (JP); Daisuke Asahina, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/925,116

(22) Filed: Oct. 28, 2015

(65) Prior Publication Data

US 2016/0122481 A1    May 5, 2016

(30) Foreign Application Priority Data

Nov. 4, 2014  (JP) ................................ 2014-224478

(51) Int. Cl.
   C08G 63/08   (2006.01)
   C08J 5/00    (2006.01)
   C08G 63/91   (2006.01)

(52) U.S. Cl.
   CPC ............... *C08J 5/00* (2013.01); *C08G 63/08* (2013.01); *C08G 63/912* (2013.01); *C08J 2367/04* (2013.01)

(58) Field of Classification Search
   CPC .......... C08G 63/08; C08J 2367/04; C08J 5/00
   See application file for complete search history.

(56) References Cited

U.S. PATENT DOCUMENTS

| | | |
|---|---|---|
| 2010/0240820 A1 | 9/2010 | Sato et al. |
| 2013/0317138 A1 | 11/2013 | Harada et al. |
| 2014/0080050 A1 | 3/2014 | Asahina et al. |

FOREIGN PATENT DOCUMENTS

| | | |
|---|---|---|
| JP | 3350618 | 9/2002 |
| JP | 2005-264086 | 9/2005 |
| JP | 2007-138131 | 6/2007 |
| JP | 2012-193337 | 10/2012 |
| JP | 5353341 | 9/2013 |

OTHER PUBLICATIONS

Wang et al "Synthesis of Polybutadiene-Polylactide Diblock Copolymers Using Aluminum Alkoxide Macroinitiators. Kinetics and Mechanism", Macromolecules 2000, 33, 7395-7403, Nov. 2000.*

* cited by examiner

*Primary Examiner* — Gregory Listvoyb
(74) *Attorney, Agent, or Firm* — Oblon, McClelland, Maier & Neustadt, L.L.P.

(57) ABSTRACT

A polylactic resin composition, including: polylactic resin as main component, wherein in a binary image of the polylactic resin composition obtained by binarizing a phase image of a cross-section of the polylactic resin composition observed with an AFM in tapping mode based on intermediate value between maximum and minimum values of phase differences of the polylactic resin composition in free vibration, phases equal to or greater than intermediate value are dispersed in a phase less than intermediate value, and average equivalent circle diameter of the phases equal to or greater than intermediate value is from 0.2 µm to 1 µm, and wherein polylactic resin composition is detected to have at least one glass transition temperature (Tg) in a range of −20° C. or lower, and at least one glass transition temperature (Tg) in a range of 40° C. to 70° C. in a temperature elevating process of differential scanning calorimeter (DSC) measurement thereof.

5 Claims, No Drawings

POLYLACTIC RESIN COMPOSITION AND MOLDING

BACKGROUND OF THE INVENTION

Field of the Invention

The present invention relates to a polylactic resin composition including a polylactic resin as a main component, and a molding of the polylactic resin composition.

Description of the Related Art

In recent years, there have been various environmental issues represented by global warming, and strong concern for depletion of fossil resources. To solve these problems, efforts for building up a recycling-oriented society are currently being made. Resin materials, most of which are produced from fossil resources, are also required to be lowly environmentally-hazardous with low fossil resource consumptions.

In such a social context, intensive activities are being conducted for developing technologies relating to biomass plastics made from plant or microorganism-derived resources, and for studying replacement of resin materials made from fossil resources. Above all, polylactic acids are highly hoped for because they are available at low prices as their high yields from plant-derived materials have been established, and they have excellent machinability and a relatively high melting point. However, the polylactic acids do not have a sufficient impact resistance relative to general-purpose resins, and their Izod impact strength is from about 2 $kJ/m^2$ to 3 $kJ/m^2$. Hence, it is difficult to employ the polylactic acids as components of electric appliances, and it is necessary to improve their impact resistance in order to use them as constructional materials.

Under such circumstances, various attempts are being made to improve the impact resistance of the polylactic acids. Impact strength or impact resistance can be improved by making the materials largely deformable until they finally break under fast deformation, and also by, for example, blending a plasticizer in the materials to increase relaxation. However, this method inevitably reduces elastic modulus and strength, and cannot be employed for constructional materials.

Hence, polymer blending with a different kind of polymeric material is selected as a method for reforming the polylactic acids and improving their impact resistance, and studied in various manners. When the different kind of polymeric material to be blended is in such a combination relationship with the polylactic acid that they dissolve with each other at the molecular level and form a homogeneous phase, the mixture to be obtained has a mechanical property proportional to the composition, which is indicated by a physical property value that is about intermediate between both of the materials and hence relatively easily predictable, which however means that the mixture cannot be a characteristic material in most of the cases. That is, the obtained material has an increased impact resistance, but also has a side effect attributed to the blended resin. In this way, combination of compatible resins often results in a trade-off between the physical property value requested to be improved and the physical property value requested to be maintained. This requires the reforming resin to be blended at a low ratio, making it impossible to obtain a drastic effect in improving impact resistance.

It is commonly by blending an incompatible polymer that it is possible to improve impact resistance without greatly degrading elastic modulus, strength, and heat resistance, and combinations with rubber materials incompatible with the matrix are often employed. A two-phase or multilayered high-order structure formed of such different kinds of polymeric materials can express physical properties that are based on mechanisms unexplainable by the proportional relationship between the mixing ratio and the physical property values, and can outgrow the antinomic dilemma between the plurality of characteristic values. However, as described in Japanese Patent Application Laid-Open (JP-A) No. 2005-264086 (PTL 1), a blend of a polylactic acid and an impact-resistant polystyrene as a reforming resin is lowly improved in impact resistance even when the content of the reforming resin is 50%, and not of a practically useful level.

One of the factors for which the reforming effect is low in the above-described case is considered to be low affinity between the polylactic acid and the reforming resin. Hence, there are proposed a reforming method by copolymerization with a rubber-like segment, and a method of blending this copolymer with a polylactic acid homopolymer. For example, Japanese Patent (JP-B) No. 3350618 (PTL 2) describes that a polylactic acid can be improved in toughness while keeping transparency and strength, by being formed as a block copolymer obtained by bonding a polylactic segment with an aromatic polyester segment and a polyalkylene ether segment. However, this method has a problem that the physical property that should be maintained is degraded, and the effect of improving impact strength is low, which necessitates increasing the ratio of the copolymerization component, resulting in degradation of transparency and significant degradation of bending elastic modulus.

Meanwhile, for example, JP-B No. 5353341 (PTL 3) describes a method of blending a copolymer with a polylactic acid homopolymer, and presents an attempt to improve impact resistance by blending a polylactic acid with a polyester copolymer. However, this method cannot provide an impact resistance that is sufficient from the viewpoint of practical usefulness, and needs improvement.

SUMMARY OF THE INVENTION

The present invention was made in view of the conventional techniques described above, and aims to achieve the object described below. That is, an object of the present invention is to provide a polylactic resin composition excellent in impact resistance and maintained in elastic modulus and strength.

Means for solving the problems described above is as follows. That is, a polylactic resin composition of the present invention is a polylactic resin composition, including:
a polylactic resin as a main component,
wherein in a binary image of the polylactic resin composition obtained by binarizing a phase image of a cross-section of the polylactic resin composition observed with an AFM in a tapping mode based on an intermediate value between a maximum value and a minimum value of the phase differences of the polylactic resin composition in free vibration, phases equal to or greater than the intermediate value are dispersed in a phase less than the intermediate value, and an average equivalent circle diameter of the phases equal to or greater than the intermediate value is from 0.2 µm to 1 µm, and
wherein the polylactic resin composition is detected to have at least one glass transition temperature (Tg) in a range equal to or lower than −20° C., and at least one glass transition temperature (Tg) in a range of from 40° C. to 70° C. in a temperature elevating process of a differential scanning calorimeter (DSC) measurement thereof.

The present invention can solve the conventional problems described above, achieve the object described above, and provide a polylactic resin composition that is improved in impact resistance while maintaining elastic modulus and strength.

DETAILED DESCRIPTION OF THE INVENTION

Polylactic Resin Composition

The polylactic resin composition of the present invention includes a polylactic resin as a main component. In addition to the polylactic resin, the polylactic resin composition of the present invention includes a resin that forms the phases equal to or greater than the intermediate value. In the present invention, it is particularly desirable that the resin that forms the phases equal to or greater than the intermediate value be a polylactic copolymer including a polylactic segment and a segment other than a polylactic acid.

The polylactic resin composition of the present invention may include additives in addition to the polylactic resin and the resin that forms the phases equal to or greater than the intermediate value.

In the present invention, when it is said that "the polylactic resin composition includes the polylactic resin as a main component", it is meant that the polylactic resin composition includes the polylactic resin in an amount of 50% by mass or greater. The polylactic resin composition may include the polylactic resin in an amount of preferably 70% by mass or greater, and more preferably 80% by mass or greater from the viewpoints of resource saving and low environmental hazardousness.

The polylactic resin does not encompass a polylactic copolymer described below, but refers to a homopolymer of a lactic acid.

<Polylactic Resin>

The polylactic resin used in the present invention is a polymer made mainly of an L-lactic acid monomer component, or a D-lactic acid monomer component, or both, and can be produced according to a known method. The polylactic resin can be produced by, for example, a method of ring-opening polymerizing lactide starting from a hydroxyl group of a polyol, and a method of subjecting a lactic acid to direct dehydration condensation.

A weight average molecular weight of the polylactic resin is not particularly limited, and may be appropriately selected according to the purpose. However, it is preferably from 50,000 to 400,000, and more preferably from 100,000 to 300,000. When the weight average molecular weight is less than 50,000, a favorable mechanical property may not be obtained. When it is greater than 400,000, machinability may be poor.

An optical purity of the polylactic resin is not particularly limited, but is preferably 90% or higher, more preferably 95% or higher, and yet more preferably 98% or higher. When the optical purity is lower than 90%, heat resistance may be poor.

A melting point of the polylactic resin is not particularly limited, and is preferably 150° C. or higher, and more preferably 160° C. or higher.

It is preferable to use a commercially available product as the polylactic resin. Examples include LAYCEA (manufactured by Mitsui Chemicals, Inc.) and INGEO (manufactured by Nature Works LLC).

<Resin that Forms Phases Equal to or Greater than Intermediate Value>

The resin that forms the phases equal to or greater than the intermediate value refers to a resin that is incompatible with the polylactic acid, and when added in the polylactic resin composition, can contribute to formation of a so-called sea-island structure represented by the binary image in which the phases equal to or greater than the intermediate value are dispersed in the phase less than the intermediate value.

The resin that forms the phases equal to or greater than the intermediate value has Tg equal to or lower than −20° C., and is incompatible with the polylactic resin. This resin is not particularly limited, and any resin that satisfies these conditions may be appropriately selected according to the purpose.

The resin that forms the phases equal to or greater than the intermediate value has a low Tg that is equal to or lower than −20° C. Hence, the resin that forms the phases equal to or greater than the intermediate value will be referred to as "low Tg resin" in the present specification.

Examples of the low Tg resin include polybutadiene, polyethylene glycol, polypropylene glycol, polytetramethylene glycol, and aliphatic polyester.

In the present invention, the low Tg resin may be a resin obtained by chain-elongating such a low Tg resin as given above that has a hydroxyl group, by using diisocyanate (a resin obtained in this manner will be referred to particularly as "urethane-modified low Tg resin").

Further, in the present invention, the low Tg resin may be a polylactic copolymer that includes a low Tg resin given above. The polylactic copolymer, which includes a polylactic segment and a low Tg resin segment, will be referred to particularly as "low Tg resin copolymer" in the present specification.

A more preferable mode of the low Tg resin copolymer may be a polylactic copolymer that includes a polylactic segment and a urethane-modified low Tg resin segment. A polylactic copolymer that is a urethane-modified low Tg resin and also a low Tg resin copolymer at the same time will be referred to particularly as "urethane-modified low Tg resin copolymer" in the present specification.

It is more preferable that the low Tg resin used in the present invention be a low Tg resin copolymer among the low Tg resins given above, and it is particularly preferable that the low Tg resin used in the present invention be a urethane-modified low Tg resin copolymer among low Tg resin copolymers.

A method for producing the urethane-modified low Tg resin is not particularly limited, and a known method may be employed. The diisocyanate used for producing the urethane-modified low Tg resin is not particularly limited, and a known diisocyanate may be used. Examples thereof include diphenyl methane diisocyanate (MDI), tolylene diisocyanate (TDI), hexamethylene diisocyanate (HDI), and isophorone diisocyanate (IPDI).

A mass ratio of the low Tg resin in the polylactic resin composition is preferably from 3% to 40%, and more preferably from 5% to 30%. When the mass ratio is less than 3%, the effect of improving impact resistance may not be obtained. When the mass ratio is greater than 40%, heat resistance may be poor.

A weight average molecular weight of the low Tg resin is not particularly limited, and may be appropriately selected according to the purpose. However, it is preferably from 30,000 to 100,000, and more preferably from 40,000 to 80,000. When the weight average molecular weight is less than 30,000, mechanical strength and heat resistance may be poor. When the weight average molecular weight is greater than 100,000, the domain size of the low Tg resin phase may be large, which makes it impossible to obtain the effect of improving impact resistance.

<<Polylactic Copolymer>>

As described above, in the present invention, it is preferable that the polylactic resin composition include a polylactic copolymer (a low Tg resin copolymer) including a polylactic segment and a low Tg resin segment other than a polylactic acid.

A glass transition temperature (Tg) attributed to the segment other than the polylactic acid is preferably equal to or lower than −20° C. A weight average molecular weight of the polylactic copolymer is preferably from 30,000 to 100,000, and more preferably from 40,000 to 80,000 as described above.

In the case of using the polylactic copolymer, a mass ratio between the polylactic segment and the low Tg resin segment (mass of the polylactic segment/mass of the low Tg resin segment) is preferably from 90/10 to 30/70, and more preferably from 80/20 to 40/60. When the mass ratio is outside the range described above, the effect of improving impact resistance may not be obtained.

It is preferable that the segment other than the polylactic acid have a urethane bond.

A method for producing the low Tg resin copolymer is not particularly limited. In the case of producing a urethane-modified low Tg resin copolymer, examples of the method therefor include ring-opening polymerization of lactide wherein the ring-opening is started from a hydroxyl group at a terminal of, for example, polybutadiene diol, polytetramethylene ether glycol, aliphatic polyester polyol, and such urethane-modified resins, all of which have the hydroxyl group at the terminal, and a method of bonding the low Tg resins given above and such urethane-modified resins with a previously produced polylactic acid by using a coupling agent such as diisocyanate. Of these, ring-opening polymerization of lactide is preferable.

<Additives>

Examples of the additives include various additives such as crystal nucleators, flame retardants, colorants, hydrolysis suppressants, lubricants, waxes, heat stabilizers, reinforcing materials, organic or inorganic fillers, antioxidants, and ultraviolet absorbers.

A content of these additives is not particularly limited, and may be appropriately selected according to the purpose. However, it is preferably from 0.1% by mass to 20% by mass of the polylactic resin composition. When it is less than 0.1% by mass, the additives may not be able to express their functions. When it is greater than 20% by mass, heat resistance, moldability, and impact resistance may be inhibited.

<Characteristics of Polylactic Resin Composition>

In a binary image of the polylactic resin composition of the present invention obtained by binarizing a phase image of a cross-section of the polylactic resin composition observed with an AFM in a tapping mode based on an intermediate value between a maximum value and a minimum value of the phase differences of the polylactic resin composition in free vibration, phases equal to or greater than the intermediate value are dispersed in a phase less than the intermediate value. An average equivalent circle diameter of the phases equal to or greater than the intermediate value is from 0.2 µm to 1 µm.

The polylactic resin composition is detected to have at least one glass transition temperature (Tg) in a range equal to or lower than −20° C., and at least one glass transition temperature (Tg) in a range of from 40° C. to 70° C. in a temperature elevating process of a differential scanning calorimeter (DSC) measurement.

Here, which of a phase in the phase image and the difference between the phase differences in free vibration of a cantilever is greater than the other is correlated with softness of that phase. That is, this means that the phase less than the intermediate value, which is the sea of the so-called sea-island structure, is a phase mainly made of the polylactic acid, and on the other hand, that the phases equal to or greater than the intermediate value are relatively softer than the phase mainly made of the polylactic acid, which is the phase less than the intermediate value.

The state in the binary image that the phases equal to or greater than the intermediate value are dispersed in the phase less than the intermediate value refers to a state that a boundary can be defined between both of the phases in the binary image, and the phases equal to or greater than the intermediate value have a circular shape and are surrounded by the phase less than the intermediate value. This state does not encompass a state that the phases equal to or greater than the intermediate value have a thin line shape having a large aspect ratio, a state that the phases equal to or greater than the intermediate value have a bar shape or form a bicontinuous phase, and a state that the phases equal to or greater than the intermediate value are concentrated locally in the phase less than the intermediate value.

When the polylactic resin composition does not have the structure in which the phases equal to or greater than the intermediate value is dispersed in the phase less than the intermediate value, impact resistance will be poor.

An average equivalent circle diameter of the phases equal to or greater than the intermediate value, i.e., of first phase difference images is preferably from 0.2 µm to 1 µm. The average equivalent circle diameter is more preferably from 0.3 µm to 0.8 µm, and yet more preferably from 0.5 µm to 0.8 µm, and particularly preferably from 0.5 µm to 0.7 µm. When the average equivalent circle diameter is outside the range described above, the effect of improving impact resistance cannot be obtained sufficiently.

The phase image can be observed in a tapping mode of an AFM (Atomic Force Microscope). The binary image can be obtained with image processing software. From the obtained binary image, equivalent circle diameters of phases equal to or greater than the intermediate value are calculated based on areas, and an average of equivalent circle diameters of fifty phases are calculated as the average equivalent circle diameter. The cross-section can be obtained by making the resin composition or a molding thereof into a thin section using a microtome manufactured by Leica Inc.

Conditions of measurement by the AFM are presented below. Examples of representative instruments include MFP-3D manufactured by Asylum Technology Co., Ltd., and DIMENSION FASTSCAN manufactured by Bruker AXS K.K.

Sample Pretreatment (1) Sample Pretreatment

The sample was made into a thin section using an ultra-microtome under the conditions described below, and the thin section was mounted over a Si wafer.

Diamond knife (ULTRA SONIC 35°) was used
Cutting thickness: 80 nm
Cutting speed: 0.1 mm/sec to 0.2 mm/sec (2) Observation The thin section of the sample mounted over the Si wafer was observed under the conditions described below, to thereby obtain a phase image.

Instrument: DIMENSION FASTSCAN manufactured by Bruker AXS K.K.
 Cantilever: OMCL-AC55TS
 Measurement mode: tapping mode
 Measurement conditions: Scan Size: 1 μm to 5 μm
  Scan Rate: 2 Hz
  Scan Pixel: 256×256
  Target Amplitude: 0.5 V
  Target Percent: 5%
  Amplitude Setpoint: about 0.35 V The polylactic resin composition of the present invention is characterized in that it is detected to have at least one glass transition temperature (Tg) in a range equal to or lower than −20° C., and at least one glass transition temperature (Tg) in a range of from 40° C. to 70° C. in a temperature elevating process of a differential scanning calorimeter (DSC) measurement.

This means that the phases equal to or greater than the intermediate value, which are the islands of the sea-island structure of the cross-section, include a resin composition that expresses a glass transition temperature Tg equal to or lower than −20°. The glass transition temperature (Tg) in the range of from 40° C. to 70° C. is attributed to the glass transition temperature (Tg) of the polylactic acid, which is the main component. Expression of these two glass transition temperatures Tg means that the resins that form the phases equal to or greater than the intermediate value, and the phase less than the intermediate value, i.e., both phases forming the first phase difference images and a second phase difference image respectively, are incompatible systems.

When the lower glass transition temperature Tg is higher than −20° C. or is not detected, the effect of improving impact resistance cannot be obtained. When no glass transition temperature Tg is present in the range of from 40° C. to 70° C., the polylactic acid and the resin composition forming the phases equal to or greater than the intermediate value are partially mixed, in which case, impact resistance is not sufficient.

The glass transition temperatures Tg can be measured with a differential scanning calorimeter (DSC).

(Molding)

The molding of the present invention is obtained by molding the polylactic resin composition of the present invention described above.

The molding of the present invention is not particularly limited except that it is obtained by molding the polylactic resin composition of the present invention, and the shape, structure, size, etch of the molding may be appropriately selected according to the purpose.

The molding method is not particularly limited, and an appropriate method may be selected from known methods according to the purpose. Examples of the molding method include film molding, extrusion molding, injection molding, blow molding, compression molding, transfer molding, calender molding, thermoforming, flow molding, and laminate molding. Among these, injection molding is particularly preferable.

<Applications>

The molding of the present invention has flame retardancy, and can be used favorably for components used in image outputting apparatuses using electrophotography, printing techniques, or inkjet techniques such as copiers and laser printers, electric and electronic appliances such as home appliances, and interior components of automobiles.

EXAMPLES

Examples of the present invention will be described below. However, the present invention is not limited to these Examples by any means. Note that "part" and "%" represent "part by mass" and "% by mass", unless otherwise expressly specified.

<Synthesis of Low Tg Resin 1>

A 2 L four-necked flask equipped with a nitrogen introducing tube, a stirrer, and a thermocouple was charged with polybutadiene diol POLY BD R-45HT (manufactured by Idemitsu Kosan Co., Ltd., with a hydroxyl value of 51 mgKOH/g), and diphenylmethane diisocyanate (MDI) such that NCO/OH=0.2, and after the temperature was elevated to 80° C., they were reacted for 3 hours, to thereby obtain a low Tg resin 1.

The obtained low Tg resin 1 has a hydroxyl value of 40 mgKOH/g, a weight average molecular weight (Mw) of 14,000, and Tg of −69° C. as presented in Table 1 below. Mw was measured according to GPC. Tg was measured with a differential scanning calorimeter (DSC).

<Synthesis of Low Tg Resin 2>

A 2 L four-necked flask equipped with a nitrogen introducing tube, a stirrer, and a thermocouple was charged with polytetramethyene ether glycol (PTMG1400) (manufactured by Wako Pure Chemical Industries, Ltd., with a hydroxyl value of 86 mgKOH/g) and diphenyl methane diisocyanate (MDI) such that NCO/OH=0.65, and after the temperature was elevated to 80° C., they were reacted for 3 hours, to thereby obtain a low Tg resin 2.

<Synthesis of Low Tg Resin 3>

A low Tg resin 3 was obtained in the same manner as the synthesis of the low Tg resin 2, except that NCO/OH=0.85 unlike in the synthesis of the low Tg resin 2.

<Synthesis of Low Tg Resin 4>

A 2 L four-necked flask equipped with a nitrogen introducing tube, a cooling tube, a stirrer, and a thermocouple was charged with 1,4-butanediol as a diol, and a sebacic acid and a terephthalic acid as dicarboxylic acids at a molar ratio of 60/40 such that OH/COOH=1.5. To which, titanium tetraisopropoxide (300 ppm) was added, and they were reacted under a nitrogen stream while draining off water, and reacted until the acid value became 5 or less while elevating the temperature up to 230° C. After this, they were reacted at a degree of vacuum of 10 mmHg while distilling away 1,4-butanediol, and reacted until the hydroxyl value became 50 mgKOH/g or less, to thereby obtain polyester 1. The obtained resin had a hydroxyl value of 48 mgKOH/g, and Tg of −45° C. Then, a 2 L four-necked flask equipped with a nitrogen introducing tube, a stirrer, and a thermocouple was charged with the polyester 1 and MDI such that NCO/OH=0.4, and after the temperature was elevated to 80° C., they were reacted for 3 hours, to thereby obtain a low Tg resin 4.

<Synthesis of Low Tg Resin 5>

A low Tg resin 5 was obtained in the same manner as the synthesis of the low Tg resin 4, except that the molar ratio between the sebacic acid and the terephthalic acid was changed to 50/50 unlike in the synthesis of the low Tg resin 4.

<Synthesis of Low Tg Resin 6>

A low Tg resin 6 was obtained in the same manner as the synthesis of the low Tg resin 4, except that the molar ratio between the sebacic acid and the terephthalic acid was changed to 40/60 unlike in the synthesis of the low Tg resin 4.

<Synthesis of Low Tg Resin 7>

A low Tg resin 7 was obtained in the same manner as the synthesis of the low Tg resin 4, except that the molar ratio between the sebacic acid and the terephthalic acid was changed to 30/70 unlike in the synthesis of the low Tg resin 4.

The properties of the respective low Tg resins are as presented in Table 1.

TABLE 1

|  | Base polymer | Hydroxyl value [mgKOH/g] | Mw | Tg [° C.] |
|---|---|---|---|---|
| POLY BD R-45HT | — | 51 | 4,600 | −70 |
| PTMG1400 | — | 86 | 3,600 | −65 |
| Polyester 1 | — | 48 | 5,100 | −45 |
| Polyester 2 | — | 46 | 5,000 | −32 |
| Polyester 3 | — | 47 | 5,100 | −23 |
| Polyester 4 | — | 45 | 5,200 | −18 |
| Low Tg resin 1 | POLY BD R-45HT | 40 | 14,000 | −69 |
| Low Tg resin 2 | PTMG1400 | 27 | 17,000 | −59 |
| Low Tg resin 3 | PTMG1400 | 11 | 32,000 | −56 |
| Low Tg resin 4 | Polyester 1 | 28 | 18,000 | −39 |
| Low Tg resin 5 | Polyester 2 | 27 | 18,000 | −25 |
| Low Tg resin 6 | Polyester 3 | 28 | 19,000 | −17 |
| Low Tg resin 7 | Polyester 4 | 26 | 19,000 | −10 |

<Synthesis of Low Tg Resin Copolymer 1>

A 2 L four-necked flask equipped with a nitrogen introducing tube, a stirrer, and a thermocouple was charged with polytetramethylene ether glycol (PTMG2900) (manufactured by Sigma-Aldrich Co., LLC) having Mw of 13,000, a hydroxyl value of 35 mgKOH/g, and Tg of −67° C., and L-lactide at a mass ratio (PTMG2900/L-lactide) of 20/80, and they were dried at reduced pressure at 60° C. for 2 hours. Next, tin 2-ethyl hexanoate (200 ppm) was added thereto, and they were polymerized under a nitrogen stream at 180° C. for 1 hour. Then, the monomer was distilled away by reducing pressure at 170° C. for 1 hour, to thereby obtain a low Tg resin copolymer 1.

<Synthesis of Low Tg Resin Copolymers 2 to 13>

Low Tg resin copolymers 2 to 13 were obtained in the same manner as the synthesis of the low Tg resin copolymer 1, except that the kind of the low Tg resin and the mass ratio of the low Tg resin to the L-lactide were changed as presented in Table 2 below.

TABLE 2

|  | Low Tg resin | | | | |
|---|---|---|---|---|---|
|  | Kind | % by mass | Tg1 [° C.] | Tg2 [° C.] | Mw |
| Low Tg resin copolymer 1 | PTMG2900 | 20 | −65 | 42 | 35,000 |
| Low Tg resin copolymer 2 | POLY BD R-45HT | 20 | −67 | 47 | 25,000 |
| Low Tg resin copolymer 3 | Low Tg resin 1 | 20 | −67 | 44 | 31,000 |
| Low Tg resin copolymer 4 | Low Tg resin 2 | 20 | −53 | 46 | 41,000 |
| Low Tg resin copolymer 5 | Low Tg resin 2 | 30 | −54 | 42 | 35,000 |
| Low Tg resin copolymer 6 | Low Tg resin 2 | 40 | −54 | 38 | 22,000 |
| Low Tg resin copolymer 7 | Low Tg resin 2 | 50 | −55 | 33 | 18,000 |
| Low Tg resin copolymer 8 | Low Tg resin 3 | 50 | −53 | 47 | 42,000 |
| Low Tg resin copolymer 9 | Low Tg resin 3 | 30 | −53 | 48 | 69,000 |
| Low Tg resin copolymer 10 | Low Tg resin 4 | 20 | −37 | 37 | 42,000 |
| Low Tg resin copolymer 11 | Low Tg resin 5 | 20 | −24 | 36 | 43,000 |
| Low Tg resin copolymer 12 | Low Tg resin 6 | 20 | −17 | 38 | 42,000 |
| Low Tg resin copolymer 13 | Low Tg resin 7 | 20 | −8 | 37 | 44,000 |

Example 1

A polylactic acid (INGEO 2500HP manufactured by Nature Works LLC), a low Tg resin, ADEKASTAB AO-60 (manufactured by Adeka Corporation), ADEKASTAB PEP-36 (manufactured by Adeka Corporation), and monocarbodiimide NCN (manufactured by Matsumoto Yushi-Seiyaku Co., Ltd.) were melted and kneaded with a biaxial kneader-extruder at a ratio presented in Table 3 below, to thereby obtain a strand of a melted-kneaded product. This was cooled in water, and then cut with a pelletizer, to thereby obtain a polylactic resin pellet, which is referred to as pellet B.

The extruder cylinder temperature was set to 170° C. to 190° C. The obtained pellet was dried, and then with an injection molder, formed into a test piece under conditions: a mold temperature of 40° C., a cylinder temperature of 190° C., an injection speed of 20 mm/sec, an injection pressure of 100 MPa, and a cooling time of 30 sec.

A tensile strength, a tensile elasticity, and a Charpy impact strength of the obtained test piece were measured according to ISO. A cross-section of the test piece was also subjected to AFM observation and DSC measurement. The results are presented in Table 4 below.

[AFM Observation Conditions]

(1) Sample Pretreatment

The sample was made into a thin section using an ultra-microtome under the conditions described below, and the thin section was mounted over a Si wafer.

Diamond knife (ULTRA SONIC 35°) was used
Cutting thickness: 80 nm
Cutting speed: 0.1 mm/sec to 0.2 mm/sec (2) Observation The thin section of the sample mounted over the Si wafer was observed under the conditions described below, to thereby obtain a phase image. The obtained phase image was adjusted in contrast such that the intermediate value between the maximum value and the minimum value of the phase differences in free vibration was indicated as a middle contrasting density. The scan size was appropriately adjusted depending on the sea-island structure of the cross-section, and observation was repeated until the number of islands in the image reached a total of 50 or more.

Instrument: DIMENSION FASTSCAN manufactured by Bruker AXS K.K.
Cantilever: OMCL-AC55TS
Measurement mode: tapping mode
Measurement conditions: Scan Size: 1 μm to 5 μm
Scan Rate: 2 Hz
Scan Pixel: 256×256

Target Amplitude: 0.5 V
Target Percent: 5%
Amplitude Setpoint: about 0.35 V (3) Image Binarizing Process and Average Equivalent Circle Diameter Calculation The obtained image was binarized and analyzed with software attached to a real color confocal microscope (OPTELICS C130 manufactured by Lasertec Corporation), and the average equivalent circle diameter of fifty phases in the obtained image that were equal to or greater than the intermediate value was calculated.

[DSC Measurement Conditions]

With a differential scanning calorimeter (Q2000 manufactured by Ta Instruments, Inc.) equipped with a liquid nitrogen cooling system (LNCS), measurement was performed from −100° C. to 200° C. at a temperature elevating rate of 10° C./min. The obtained DSC chart was analyzed according to a midpoint method using the midpoint of the chart, to thereby obtain a lower Tg as T0, and a higher Tg as Tg2.

[Tensile Strength and Tensile Elasticity]

Tensile strength and tensile elasticity were measured according to IS0527 using AUTOGRAPH AG-10KNX-PLUS (manufactured by Shimadzu Corporation) as a measuring instrument.

[Charpy Impact Strength]

Charpy impact strength was measured according to ISO179 using a digital impact tester DG-CB (manufactured by Toyo Seiki Seisaku-Sho, Ltd.) as a measuring instrument.

Examples 2 to 13

Test pieces of Examples 2 to 13 were produced in the same manner as in Example 1 except that the kind of the low Tg resin and the mixing ratio between the polylactic acid and the low Tg resin were changed as presented in Table 3, and the properties of the test pieces were evaluated. The results are presented in Table 4.

Comparative Examples 1 to 9

Test pieces of Comparative Examples 1 to 9 were produced in the same manner as in Example 1 except that the kind of the low Tg resin and the mixing ratio between the polylactic acid and the low Tg resin were changed as presented in Table 3, and the properties of the test pieces were evaluated. The results are presented in Table 4.

TABLE 3

| | Polylactic acid | Low Tg resin A | | Low Tg resin B | | ADEKASTAB AO-60 | ADEKASTAB PEP-36 | NCN |
|---|---|---|---|---|---|---|---|---|
| | Part by mass | Kind | Part by mass | Kind | Part by mass | Part by mass | Part by mass | Part by mass |
| Ex. 1 | 75 | Low Tg resin copolymer 1 | 25 | — | — | 0.5 | 0.5 | 0.5 |
| Ex. 2 | 75 | Low Tg resin copolymer 2 | 25 | — | — | 0.5 | 0.5 | 0.5 |
| Ex. 3 | 75 | Low Tg resin copolymer 3 | 25 | — | — | 0.5 | 0.5 | 0.5 |
| Ex. 4 | 75 | Low Tg resin copolymer 4 | 25 | — | — | 0.5 | 0.5 | 0.5 |
| Ex. 5 | 84 | Low Tg resin copolymer 5 | 16 | — | — | 0.5 | 0.5 | 0.5 |
| Ex. 6 | 90 | Low Tg resin copolymer 8 | 10 | — | — | 0.5 | 0.5 | 0.5 |
| Ex. 7 | 84 | Low Tg resin copolymer 9 | 16 | — | — | 0.5 | 0.5 | 0.5 |
| Ex. 8 | 75 | Low Tg resin copolymer 10 | 25 | — | — | 0.5 | 0.5 | 0.5 |
| Ex. 9 | 75 | Low Tg resin copolymer 11 | 25 | — | — | 0.5 | 0.5 | 0.5 |
| Ex. 10 | 80 | Low Tg resin copolymer 8 | 20 | — | — | 0.5 | 0.5 | 0.5 |
| Ex. 11 | 70 | Low Tg resin copolymer 8 | 30 | — | — | 0.5 | 0.5 | 0.5 |
| Ex. 12 | 70 | Low Tg resin copolymer 4 | 25 | Low Tg resin 3 | 5 | 0.5 | 0.5 | 0.5 |
| Ex. 13 | 65 | Low Tg resin copolymer 4 | 25 | Low Tg resin 3 | 10 | 0.5 | 0.5 | 0.5 |
| Comp. Ex. 1 | 100 | — | — | — | — | — | — | — |
| Comp. Ex. 2 | 95 | — | — | Low Tg resin 2 | 5 | 0.5 | 0.5 | 0.5 |
| Comp. Ex. 3 | 90 | — | — | Low Tg resin 2 | 10 | 0.5 | 0.5 | 0.5 |
| Comp. Ex. 4 | 95 | — | — | Low Tg resin 3 | 5 | 0.5 | 0.5 | 0.5 |
| Comp. Ex. 5 | 95 | — | — | Low Tg resin 4 | 5 | 0.5 | 0.5 | 0.5 |
| Comp. Ex. 6 | 87 | Low Tg resin copolymer 6 | 13 | — | — | 0.5 | 0.5 | 0.5 |
| Comp. Ex. 7 | 90 | Low Tg resin copolymer 7 | 10 | — | — | 0.5 | 0.5 | 0.5 |
| Comp. Ex. 8 | 75 | Low Tg resin copolymer 12 | 25 | — | — | 0.5 | 0.5 | 0.5 |
| Comp. Ex. 9 | 75 | Low Tg resin copolymer 13 | 25 | — | — | 0.5 | 0.5 | 0.5 |

TABLE 4

| | Tg1 [° C.] | Tg2 [° C.] | Ave. equiv. circle dia. [μm] | Tensile strength [MPa] | Tensile elasticity [GPa] | Charpy impact strength [kJ/m] |
|---|---|---|---|---|---|---|
| Ex. 1 | −66 | 47 | 0.86 | 68 | 2.4 | 5.4 |
| Ex. 2 | −67 | 57 | 0.79 | 67 | 2.4 | 4.9 |
| Ex. 3 | −68 | 50 | 0.61 | 70 | 2.5 | 7.1 |
| Ex. 4 | −54 | 53 | 0.42 | 69 | 2.6 | 6.8 |
| Ex. 5 | −54 | 45 | 0.94 | 67 | 2.5 | 4.8 |
| Ex. 6 | −55 | 54 | 0.62 | 72 | 2.7 | 10.4 |
| Ex. 7 | −55 | 53 | 0.54 | 70 | 2.7 | 12 |
| Ex. 8 | −39 | 43 | 0.81 | 69 | 2.6 | 5.2 |
| Ex. 9 | −24 | 44 | 0.77 | 68 | 2.5 | 4.7 |
| Ex. 10 | −53 | 47 | 0.73 | 67 | 2.5 | 11.3 |
| Ex. 11 | −54 | 47 | 0.87 | 68 | 2.5 | 8.1 |
| Ex. 12 | −55 | 46 | 0.65 | 67 | 2.6 | 9.3 |
| Ex. 13 | −52 | 46 | 0.89 | 66 | 2.5 | 5.6 |
| Comp. Ex. 1 | — | 63 | — | 71 | 2.7 | 3.8 |
| Comp. Ex. 2 | −59 | 45 | 2.9 | 66 | 2.4 | 3.7 |
| Comp. Ex. 3 | −58 | 46 | 6.2 | 64 | 2.3 | 3.5 |
| Comp. Ex. 4 | −57 | 45 | 3.4 | 67 | 2.4 | 3.9 |
| Comp. Ex. 5 | −38 | 44 | 3.8 | 63 | 2.4 | 4.1 |
| Comp. Ex. 6 | −54 | 41 | 1.1 | 66 | 2.3 | 3.9 |
| Comp. Ex. 7 | −55 | 33 | 3.1 | 62 | 2.1 | 3.2 |

TABLE 4-continued

|  | Tg1 [° C.] | Tg2 [° C.] | Ave. equiv. circle dia. [μm] | Tensile strength [MPa] | Tensile elasticity [GPa] | Charpy impact strength [kJ/m] |
|---|---|---|---|---|---|---|
| Comp. Ex. 8 | −17 | 43 | 0.82 | 68 | 2.5 | 4.2 |
| Comp. Ex. 9 | −8 | 42 | 0.88 | 69 | 2.6 | 4 |

Aspects of the present invention are as follows, for example.

<1> A polylactic resin composition, including:
  a polylactic resin as a main component,
  wherein in a binary image of the polylactic resin composition obtained by binarizing a phase image of a cross-section of the polylactic resin composition observed with an AFM in a tapping mode based on an intermediate value between a maximum value and a minimum value of the phase differences of the polylactic resin composition in free vibration, phases equal to or greater than the intermediate value are dispersed in a phase less than the intermediate value, and an average equivalent circle diameter of the phases equal to or greater than the intermediate value is from 0.2 μm to 1 μm, and
  wherein the polylactic resin composition is detected to have at least one glass transition temperature (Tg) in a range equal to or lower than −20° C., and at least one glass transition temperature (Tg) in a range of from 40° C. to 70° C. in a temperature elevating process of a differential scanning calorimeter (DSC) measurement of the polylactic resin composition.

<2> The polylactic resin composition according to <1>, including:
  a polylactic copolymer including a polylactic segment and a segment other than a polylactic acid,
  wherein a glass transition temperature (Tg) attributed to the segment other than a polylactic acid is −20° C. or lower.

<3> The polylactic resin composition according to <2>,
  wherein a mass ratio between the polylactic segment and the segment other than a polylactic acid in the polylactic copolymer (mass of the polylactic segment/mass of the segment other than a polylactic acid) is from 90/10 to 30/70, and
  wherein a weight average molecular weight of the polylactic copolymer is from 30,000 to 100,000.

<4> The polylactic resin composition according to <2> or <3>,
  wherein the segment other than a polylactic acid in the polylactic copolymer includes a urethane bond.

<5> The polylactic resin composition according to any one of <1> to <4>,
  wherein the average equivalent circle diameter is from 0.3 μm to 0.8 μm.

<6> A molding, obtained by molding the polylactic resin composition according to any one of <1> to <5>.

This application claims priority to Japanese application No. 2014-224478, filed on Nov. 4, 2014 and incorporated herein by reference.

What is claimed is:

1. A polylactic resin composition, comprising:
  a polylactic resin as a main component, and
  a polylactic copolymer that comprises a polylactic segment and a segment other than a polylactic acid,
  wherein in a binary image of the polylactic resin composition obtained by binarizing a phase image of a cross-section of the polylactic resin composition observed with an AFM in a tapping mode based on an intermediate value between a maximum value and a minimum value of phase differences of the polylactic resin composition in free vibration, phases equal to or greater than the intermediate value are dispersed in a phase less than the intermediate value, and an average equivalent circle diameter of the phases equal to or greater than the intermediate value is from 0.2 μm to 1 μm,
  wherein the polylactic resin composition is detected to have at least one glass transition temperature (Tg) in a range equal to or lower than −20° C., and at least one glass transition temperature (Tg) in a range of from 40° C. to 70° C. in a temperature elevating process of a differential scanning calorimeter (DSC) measurement of the polylactic resin composition and
  wherein a glass transition temperature (Tg) attributed to the segment other than a Tactic acid is −20° C. or lower.

2. The polylactic resin composition according to claim 1, wherein a mass ratio between the polylactic segment and the segment other than a polylactic acid in the polylactic copolymer (mass of the polylactic segment/mass of the segment other than a polylactic acid) is from 90/10 to 30/70, and
  wherein a weight average molecular weight of the polylactic copolymer is from 30,000 to 100,000.

3. The polylactic resin composition according to claim 1, wherein the segment other than a polylactic acid in the polylactic copolymer comprises a urethane bond.

4. The polylactic resin composition according to claim 1, wherein the average equivalent circle diameter is from 0.3 μm to 0.8 μm.

5. A molding, obtained by molding the polylactic resin composition according to claim 1,
  wherein the polylactic resin composition comprises a polylactic resin as a main component,
  wherein in a binary image of the polylactic resin composition obtained by binarizing a phase image of a cross-section of the polylactic resin composition observed with an AFM in a tapping mode based on an intermediate value between a maximum value and a minimum value of phase differences of the polylactic resin composition in free vibration, phases equal to or greater than the intermediate value are dispersed in a phase less than the intermediate value, and an average equivalent circle diameter of the phases equal to or greater than the intermediate value is from 0.2 μm to 1 μm, and
  wherein the polylactic resin composition is detected to have at least one glass transition temperature (Tg) in a range equal to or lower than −20° C., and at least one glass transition temperature (Tg) in a range of from 40° C. to 70° C. in a temperature elevating process of a differential scanning calorimeter (DSC) measurement of the polylactic resin composition.

* * * * *